United States Patent

[11] 3,578,364

| [72] | Inventor | Hermann Ehrenberg Langen/Hessen Kiliansweg 5, Michelstadt/Odenwald, Germany |
|---|---|---|
| [21] | Appl. No. | 811,145 |
| [22] | Filed | Mar. 27, 1969 |
| [45] | Patented | May 11, 1971 |
| [73] | Assignee | Fouquet-Werk Frauz & Planck Rottenburg, Neckar, Germany |
| [32] | Priority | Dec. 30, 1968 |
| [33] | | Germany |
| [31] | | P 18 17 398.3 |

[54] CONNECTING ARRANGEMENT
16 Claims, 10 Drawing Figs.

| [52] | U.S. Cl. | 287/52 |
|---|---|---|
| [51] | Int. Cl. | F16d 1/06 |
| [50] | Field of Search | 287/52, 52.04, 52.06; 279/2 |

[56] References Cited
UNITED STATES PATENTS

| 2,326,866 | 8/1943 | Kincaid, Jr. | 279/2UX |
| 2,460,510 | 2/1949 | Laesser | 287/52.06 |
| 2,734,750 | 2/1956 | Nyland | 279/2 |
| 2,798,748 | 7/1957 | Maurer | 287/52.04X |
| 2,801,858 | 8/1957 | Spieth | 279/2 |
| 3,036,838 | 5/1962 | Barber | 279/2 |
| 2,989,327 | 6/1961 | Hermanns | 287/52 |
| 3,112,116 | 11/1963 | Seitz | 279/2 |
| 3,168,338 | 2/1965 | Spieth | 287/52 |

*Primary Examiner*—David J. Williamowsky
*Assistant Examiner*—Andrew V. Kundrat
*Attorney*—Michael S. Striker ABSTRACT: A substantially cylindrical inner member is surrounded with clearance by an annular outer member. Connecting means is located in this clearance in form of one or several axially consecutive annular members which in axial section are of substantially Z-shaped or substantially Y-shaped configuration and which, when subjected to axial stress, are spread radially into engagement with the opposed surfaces on the inner and outer member, thereby connecting the members against movement relative to one another.

Patented May 11, 1971

INVENTOR
HERMANN EHRENBERG

BY Michael S. Striker
ATTORNEY

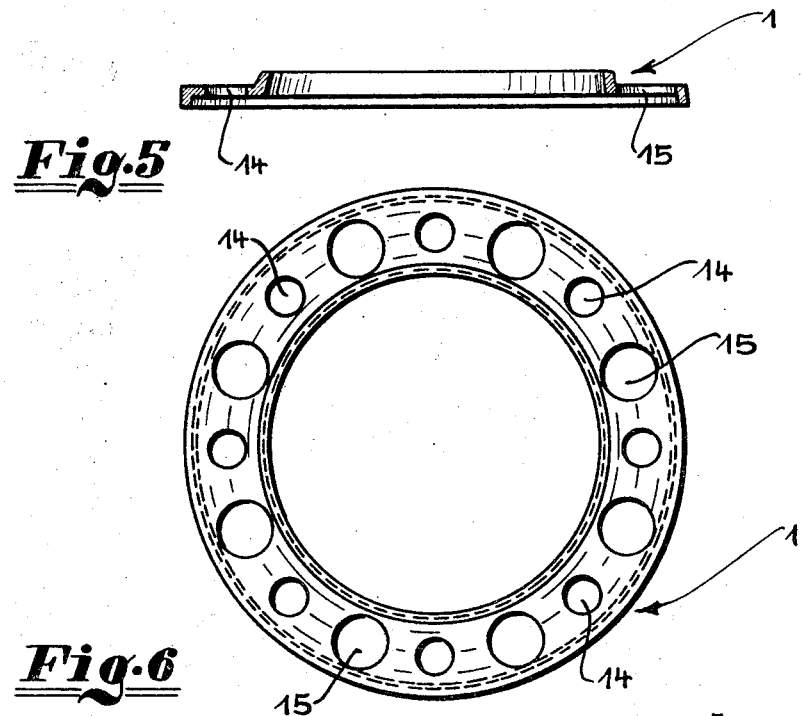
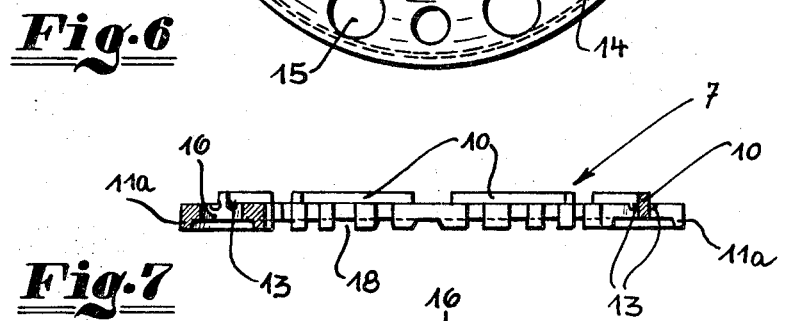
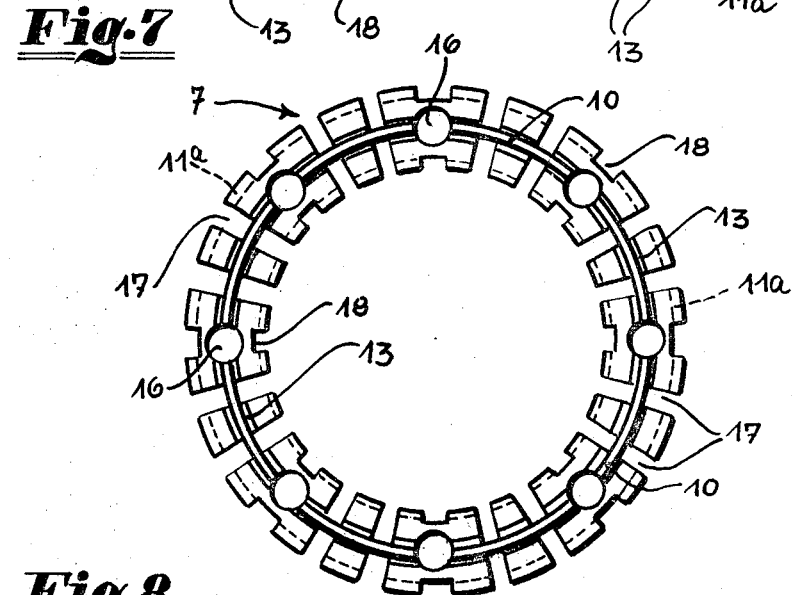

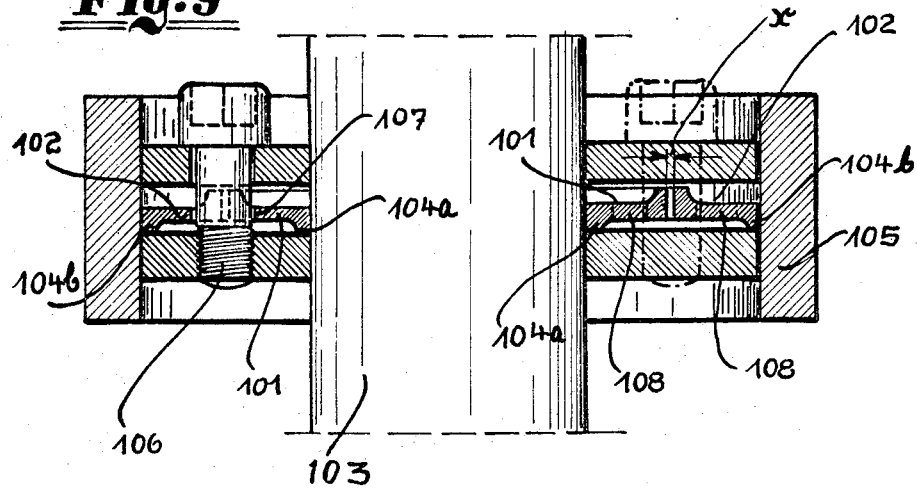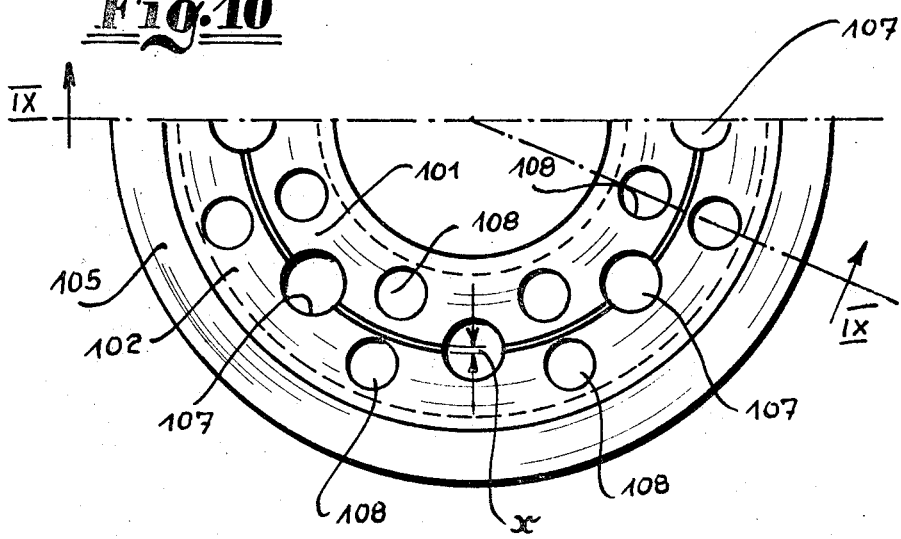

3,578,364

1

CONNECTING ARRANGEMENT

BACKGROUND OF THE INVENTION

The present invention relates to a connecting arrangement in general, and more particularly to an arrangement for connecting two members one of which surrounds the other with annular clearance.

Connecting arrangements for the above purpose are of course already known in the art. They are used, for instance, for connecting a sleeve or a bushing to a shaft extending therethrough. Of course, it is possible to connect the two members by keying, that is to provide the juxtaposed faces of the members with grooves in which a key or retaining member is received. However, this evidently results in weakening of the members where they are provided with such grooves and in many instances this is undesirable.

For this reason, arrangements have become known where dished annular springs are located in the clearance between the shaft and the bushing, surrounding the former and, when subjected to axial pressure and thereby to deformation from dished to a planar condition, will engage the shaft and the bushing with their inner and outer edges, respectively. However, the contact thus established is merely a line contact and it has been found that the effectiveness of such a connection—that is its resistance to forces tending to move the shaft and the bushing with reference to one another—can be increased only to a certain point by the addition of further springs. Once a given optimum number of such springs has been reached, the addition of further springs will provide no increase in the connecting force exerted by this type of arrangement.

Similar problems exist in analogous arrangements which have been proposed for the purpose of eliminating the need for key-type connections.

SUMMARY OF THE INVENTION

It is, therefore, a general object of the present invention to avoid the disadvantages of arrangements existing in the art.

More particularly, it is an object of the present invention to provide a connecting arrangement of the type under discussion which requires no keying and wherein the connecting means used for connecting the inner with the surrounding outer member has area-contact with both.

An additional object of the invention is to provide such an arrangement wherein no or only very small frictional forces are required to be overcome when the connecting arrangement is put into operative condition.

A concomitant object of the invention is to provide such a connecting arrangement wherein all connecting elements used provide an equal and simultaneous connecting action.

Still a further object of the invention is to provide such a connecting arrangement wherein, when the connecting arrangement is put into operative condition, no axial or other shifting of the connecting means occurs with reference to the members which are to be connected.

In pursuance of the above objects, and others which will become apparent hereafter, one feature of my invention resides in the provision of a connecting arrangement of the type described, wherein a substantially cylindrical inner member having an outer circumferential surface is surrounded with clearance by an annular outer member having an inner circumferential surface spaced from the outer circumferential surface of the inner member and defining therewith an annular gap or clearance.

Connecting means received in this clearance for connecting the members against movement relative to one another. According to my invention this connecting means includes at least one annular element having an inner and an outer annular wall portion each extending axially of the clearance and frictionally engaging the outer and inner circumferential surface, respectively. An annular transverse wall portion extends transversely of the annular clearance intermediate the inner and outer annular wall portions. Stressing means is provided and is operative for engaging the connecting means and subjecting the annular element to axial stresses in a sense effecting radial expansion of the annular element so that the inner and outer wall portions thereof respectively frictionally engage the outer and inner circumferential surfaces of the aforementioned members.

According to my invention, the annular element of which two or more may be arranged in axial succession, is of an axial sectional configuration which either resembles a stylized Z, or the similarly stylized Y. However, according to the present invention it is also possible to construct each annular connecting element of two concentric annular sections each of which has an axial sectional configuration resembling a stylized Z with the aforementioned inner and outer annular wall portions respectively being provided on the inner margin of the inner section and on the outer margin of the outer section, and both extending to one axial side of the respective element, and with additional annular wall portions being provided at the facing margins of the two concentric sections and extending to the other axial side of the annular element, so that the axial section of the two annular sections together has the form of a stylized Y.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 5 is a view similar to FIG. 3 but with the section having been taken on a somewhat different line;

FIG. 6 is a top plan view of FIG. 5;

FIG. 7 is a view analogous to FIG. 4 but of a somewhat different embodiment;

FIG. 8 is a top plan view of FIG. 7;

FIG. 9 is a view similar to FIG. 2 but taken on the line IX—IX of FIG. 10 and illustrating a somewhat different embodiment of the invention; and FIG. 10 is a fragmentary top plan view of FIG. 9.

DESCRIPTION OF THE PREFERRED EMBODIMENTS

Figure 1:
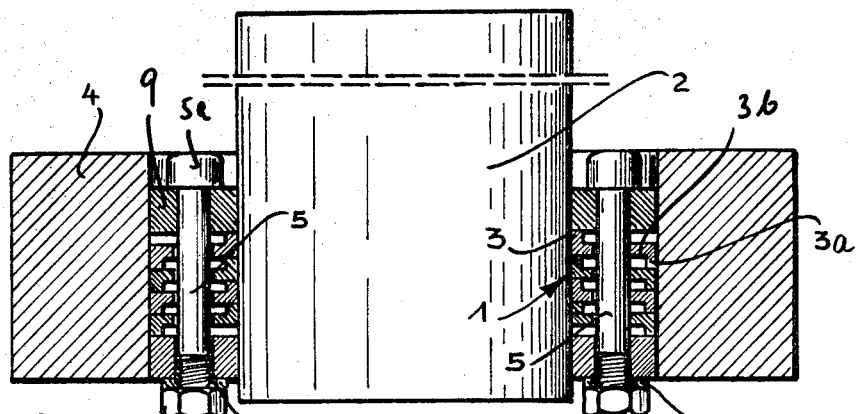
FIG. 1 is an axial section through an arrangement according to one embodiment of the invention.

Discussing the drawing in detail, and firstly the embodiment illustrated in FIGS. 1, 3, 5 and 6, it will be seen that a sleeve or bushing 4 surrounds with clearance the outer circumferential surface of a shaft 2 to which latter it is to be connected. In accordance with my invention, I provide for this purpose connecting means in form of a plurality of axially stacked annular connecting elements 1 which are located in the clearance between the shaft 2 and the inner circumferential surface of the bushing 4. In the illustrated embodiment the connecting elements 1 are in axial section of a configuration resembling substantially a stylized Z. This is clearly evident in FIG. 1 as well as in FIG. 3. Each of the elements 1 has an inner annular wall portion 3 extending to one axial side of the element and an outer annular wall portion 3a extending to the opposite axial side of the element, with an annular transverse wall portion 3b (see FIG. 1) extending between the annular wall portion 3 and 3a. In FIG. 1 it will be seen that the annular wall portions 3 are in axial abutment with one another, and that the same is true of the annular portion of 3a.

In this embodiment the transverse wall portion 3b is provided with a plurality of circumferentially spaced apertures 14 which register with one another so that stressing means, here illustrated as bolts 5, can be extended through these registering apertures 14 as shown in FIG. 1. An annular ring 9 is interposed between the heads 5a of the bolts 5 and the package of annular elements 1, and the same is true of the other axial end of the package and the nuts 5b threaded onto the bolts 5, with washers 6 being here additionally interposed, as illustrated.

It will be understood that tightening of the nuts 5b in a sense imparting axial stress to the package of annular elements 1 results in radial inward deflection of the annular wall portions 3 and radial outward deflection of the annular wall portions 3a so that they are respectively forced into tight engagement with the outer circumferential surface of the shaft 2 and the inner circumferential surface of the bushing 4. Depending upon the extend to which axial force or stress is imparted to the package of annular elements, the contact between the wall portions 3 and 3a and the associated surfaces of the members 2 and 4, respectively, will be over a part or over the entire axial length of the wall portions 3 and 3a.

Figure 3:
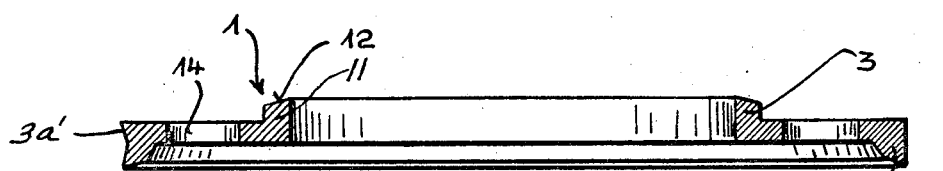
FIG. 3 is an axial section through an annular connecting element of the embodiment shown in FIG. 1.

As shown in FIG. 3, the edge face 3a' of the outer annular wall portion 3a—and of course analogously the corresponding edge face of the wall portion 3—may be undercut, as shown. Also, the axial end faces of one or both of the wall portions 3, 3a may be inclined, as indicated with reference numeral 12. FIGS. 5 and 6 show further that intermediate the apertures 14 for the bolts 5, the transverse wall portion 3b of the respective annular elements 1 may be provided with holes 15 of such diameter that they extend to the annular wall portions 3 and 3a, that is of a diameter larger than that of the apertures 14. The purpose of this measure is to further enhance the springy elastically yieldable characteristic of the annular elements 1, which characteristic is inherently achieved by making the elements 1 of a suitable material, such as spring material, for instance steel. The wall portions 3 and 3a are indicated with broken lines in FIG. 6.

Figure 2:
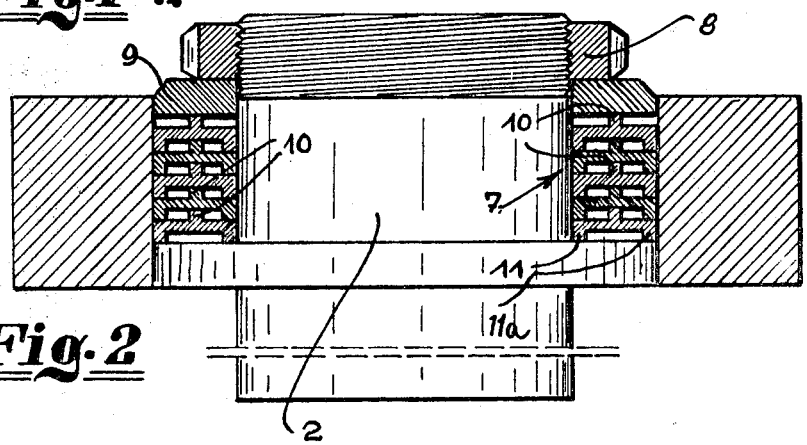
FIG. 2 is a view similar to FIG. 1 illustrating another embodiment of the invention.
Figure 4:
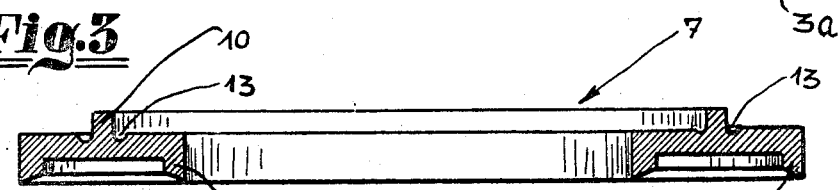
FIG. 4 is a view similar to FIG. 3 of an annular connecting element of the type shown in FIG. 2.

The embodiment illustrated in FIGS. 2 and 4 differs from that of FIG. 1 in that the axial sectional configuration of the annular elements, which are here identified with reference numeral 7, is substantially in form of a stylized Y. Here, the inner annular wall portion is identified with reference numeral 11 and the outer annular wall portion with reference numeral 11a, both extending to one and the same side of the element 7. Intermediate the wall portions 11 and 11a, there is provided an additional annular wall portion 10 located substantially midway between them but extending to the opposite axial side of the element 7. It will be seen from FIG. 2 that the wall portions 11 and 11a of each element abut against a corresponding wall portion of the axially adjacent element, whereas the wall portion 10 abuts against the wall portion 10 of the axially element, or rather against the transverse wall portion but in axial alignment with the wall portion 10 of the axially adjacent element. The stressing means in FIG. 2 is provided in form of a nut 8 which is threaded onto the shaft 2 and which exerts axial pressure against the package of annular elements 7 through the intermediary of the interposed ring member 9. It will be appreciated that turning of the nut 8 in a sense of effecting axial compression of the annular elements 7, will result in radially inward an outward spreading of the annular wall portions 11 and 11a, respectively, so that they engage the shaft 2 and the bushing 4. The pressure is transmitted through the respective annular wall portion 13. Again, the question whether the wall portions 11 and 11a will be in surface-to-surface contact with the members 2 and 4 over the entire axial length of the respective edge faces of the wall portions 11 and 11a, depends upon the axial stresses which are being exerted by the nut 8. FIG. 4 shows that grooves 13—which may or may not be undercut—may be provided extending along the root of the respective wall portions 10. This facilitates radially outward deflection of the wall portions 11 and 11a by virtue of the fact that the two annular sections of the transverse wall portion—which are located at opposite sides of the additional annular wall portion 10—will more readily move to a position of mutual inclination by the provision of the grooves 13.

The embodiment illustrated in FIGS. 6 and 7 corresponds substantially to the embodiment in FIGS. 2 and 4. It differs therefrom in that the elasticity of each of the annular elements 7 is further enhanced by providing a plurality of angularly spaced holes 16 which extend through the transverse wall portion as well as through the additional annular wall portion 10. Furthermore, a plurality of cutouts 17 are provided intermediate the holes 16 and extend through the annular wall portions 11 and 11a and through the transverse wall portion inwardly to the additional annular wall portion 10. In other words, as seen in FIG. 7, where the cutouts 17 are provided the entire radial thickness of each element 7 corresponds to the radial thickness of the additional annular wall portion 10. To still further enhance the elasticity of the elements 7, additional cutouts 18 may be provided radially opposite the respective holes 16, and these cutouts 18 extend through the annular wall portions 11 and 11a and into the transverse wall portion but terminate short of the holes 16. This is clearly shown in FIG. 8, particularly.

The wall thickness of the various portions of the elements 1 and 7 may be constant throughout, or it may vary as for instance in FIG. 7 where the thickness of the annular wall portions 11 and 11a increases from their respective free edges in direction towards their connected edges, that is the edges which are connected with the transverse wall portion.

This leaves for discussion of the embodiment illustrated in FIGS. 9 and 10. In this embodiment each of the annular elements consists of an inner annular section 101 and a concentric outer annular section 102 which surrounds the inner section 101. Each of the sections 101 and 102 is of substantially Z-shaped axial sectional configuration, as shown in FIG. 9, but their cross section is mirror-symmetrical so that the annular wall portion 104a of the section 101—corresponding to the annular wall portion 11 of FIG. 3—and the annular wall portion 104a of the section 102—corresponding to the annular wall portion 11a of FIG. 4—both extend to one and the same axial side of the respective annular element, in the same manner as in FIG. 4. The sections 101 and 102 are of substantially identical radial width and their facing inner edge portions are each provided with an additional annular wall portion both of which extend to the other axial side of the composite annular element consisting of the sections 101 and 102. Thus, the combined axial sectional configuration of the two sections 101 and 102 is again that of a stylized Y, as in the embodiment of FIG. 4. The annular wall portions 104a and 104b are of identical axial length, as are the additional annular wall portions, and I prefer that between these additional annular wall portions there be a narrow annular gap x.

The shaft in this embodiment is identified with reference numeral 103 and the bushing with reference numeral 105. The stressing means is shown in form of bolts 106 which are threaded through suitable apertures 107 provided in the composite annular elements, and the operation is the same as in the preceding embodiments in that stressing via the bolts 106 results in radial pressing of the wall portion 104a into frictional engagement with the outer circumferential surface of the shaft 103 and of the wall portion 104b into frictional engagement with the inner circumferential surface of the bushing 105. This is enhanced by the provision of the gap x because this allows for a certain amount of freedom of tilting of the sections 101 and 102 with respect to one another. As shown in FIG. 10, additional holes 108 are provided in the transverse wall portions of the sections 101 and 102 and have a diameter corresponding substantially to the distance between the respective annular wall portions provided on each of the sections 101 and 102.

The embodiment illustrated in FIGS. 9 and 10 is as effective as the embodiments illustrated in the preceding FIGS. but requires less axial compressive force; conversely, if an axial compressive force is applied in an embodiment of the type shown in FIGS. 9 and 10 which force is equal to the force employed for a corresponding embodiment of the type shown in FIGS. 1 or 2, then in the embodiment of FIGS. 9 and 10 the connecting force achieved will be correspondingly greater.

As in the preceding embodiments, the material of the sections 101 and 102 will be elastically yieldable, for instance steel. Also, the wall thickness of the various annular wall portions 104a, 104b and those which are not separately identified with reference numerals, preferably increases in direction towards the transverse wall portions of the sections 101 and 102.

It will be understood that each of the elements described above, or two or more together, may also find a useful application in other types of constructions differing from the types described above.

While the invention has been illustrated and described as embodied in a connecting arrangement, it is not intended to be limited to the details shown, since various modifications and structural changes may be made without departing in any way from the spirit of the present invention.

I claim:

1. An arrangement of the character described, comprising a substantially cylindrical inner member having an outer circumferential surface and a longitudinal axis; an annular outer member coaxially surrounding said inner member and having an inner circumferential surface spaced from said outer circumferential surface and defining therewith an annular clearance; connecting means received in said clearance for connecting said members against movement relative to one another, said connecting means including at least one annular element of elastically yieldable material having an inner and an outer annular wall portion each having spaced axial ends and when unstressed extending axially of said clearance in frictional engagement with said outer and said inner circumferential surface, respectively, and an annular transverse wall portion extending normal to said axis when unstressed and transversely of said annular clearance intermediate and connected with said inner and outer annular wall portions at a respective end of each of said inner and outer wall portions and stressing means operative for engaging said connecting means and subjecting said annular element to axial stresses in a sensing effecting radial displacement of one axial end relative to the other axial end of each of said annular wall portions, so that said inner and outer wall portions respectively frictionally engage said outer and inner circumferential surfaces of said members.

2. An arrangement as defined in claim 1, said inner and outer annular wall portions having respectively at one of said ends free edges axially spaced from, and at the other of said ends connected edges connected with said annular transverse wall portion, and wherein the thickness of said inner and outer annular wall portions increases in direction from said free edges to said connected edges thereof.

3. An arrangement as defined in claim 1, wherein said annular element is of substantially Z-shaped axial sectional configuration.

4. An arrangement as defined in claim 3, wherein said inner and outer annular wall portions are of substantially identical axial length.

5. An arrangement as defined in claim 1, wherein said annular element is of substantially Y-shaped axial sectional configuration.

6. An arrangement as defined in claim 5, wherein said inner and outer annular wall portions extend to one axial side of said transverse annular wall portion, and wherein said element further comprises a stress-receiving additional annular wall portion provided on and extending from the other axial side of said transverse annular wall portion intermediate of and substantially concentric with said inner and outer annular wall portions and arranged to cooperate with said stressing means.

7. An arrangement as defined in claim 1, said annular transverse wall portion being provided with a plurality of circumferentially spaced holes.

8. An arrangement as defined in claim 3, said annular transverse wall portion being provided with a plurality of circumferentially spaced holes.

9. An arrangement as defined in claim 6, said annular transverse wall portion and said additional annular wall portion being provided with a plurality of circumferentially spaced holes extending through both.

10. An arrangement as defined in claim 9, said element being provided with a plurality of cutouts located intermediate successive ones of said holes and extending through said inner and outer annular wall portions into said annular transverse wall portion and to said additional annular wall portion.

11. An arrangement as defined in claim 10, said element further comprising a plurality of recesses located intermediate successive ones of said cutouts and extending through said inner and outer annular wall portions into said annular transverse wall portion toward but short of a respective one of said holes.

12. An arrangement as defined in claim 1, said element consisting of an innermost annular section having an inner circumferential margin provided with said inner annular wall portion, and a concentric outermost annular section surrounding said innermost section and having an outer circumferential margin provided with said outer annular wall portion, said wall portions both extending to one axial side of said element, and said sections having facing marginal portions respectively provided with stress-receiving additional annular wall portions both extending to the other axial side of said element and arranged to cooperate with said stressing means.

13. An arrangement as defined in claim 12, wherein said additional annular wall portions define between themselves a narrow annular gap.

14. An arrangement as defined in claim 1, said connecting means comprising at least one additional annular element similar to the first-mentioned one and axially adjacent thereto, both of said annular elements being provided with a plurality of registering circumferentially spaced openings; and wherein said stressing means comprises bolt means received in same of said apertures and operative for drawing said elements together in axial direction whereby to effect said radial expansion of said elements.

15. An arrangement as defined in claim 1, wherein said material is a metallic material.

16. An arrangement as defined in claim 1, wherein said material is steel.